United States Patent Office.

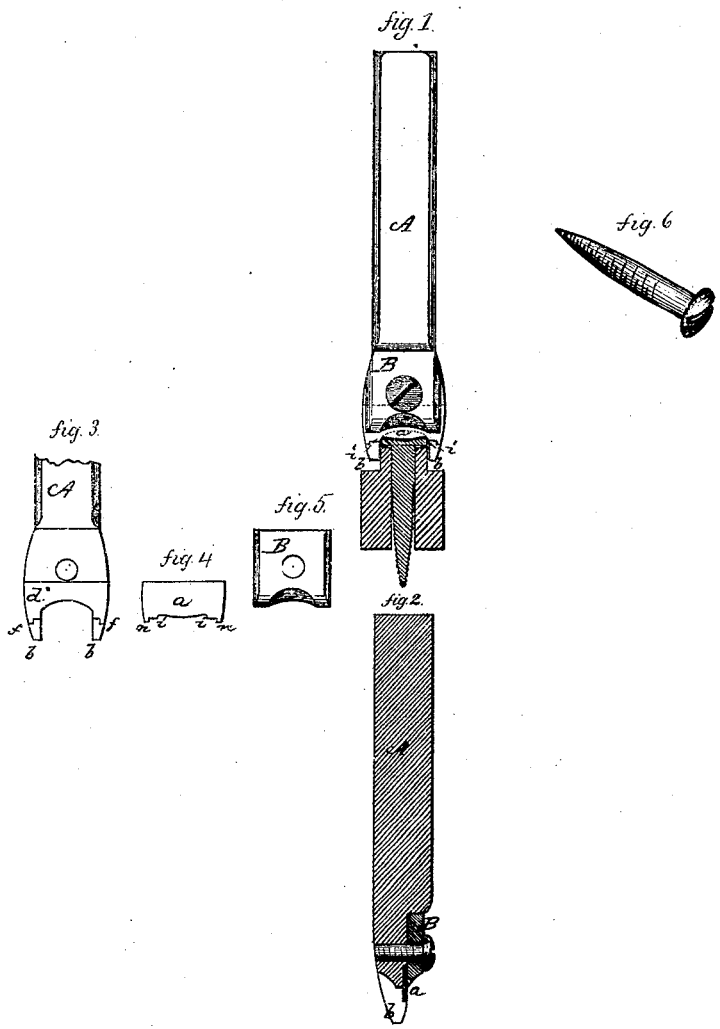

WILLIAM HILLHOUSE AND GEORGE W. BRIGGS, OF NEW HAVEN, CONNECTICUT, ASSIGNORS TO "THE GRILLEY COMPANY," OF SAME PLACE.

Letters Patent No. 110,761, dated January 3, 1871.

IMPROVEMENT IN DEVICES FOR NICKING SCREW-CAPS.

The Schedule referred to in these Letters Patent and making part of the same.

*To all whom it may concern:*

Be it known that we, WILLIAM HILLHOUSE and GEORGE W. BRIGGS, of New Haven, in the county of New Haven and State of Connecticut, have invented a new Improvement in Hand Tool for Nicking Capped Screws; and we do hereby declare the following, when taken in connection with the accompanying drawing and the letters of reference marked thereon, to be a full, clear, and exact description of the same, and which said drawing constitutes part of this specification, and represents in—

Figure 1, a front view of the tool, with the screw and holding-die in section.

Figure 2, a vertical central section.

Figures 3 4 5, parts of the tool detached; and in

Figure 6, a perspective view of the screw.

This invention relates to an improvement in a tool for cutting the nick through the metallic cap of oval-headed screws.

To do this an indentation is made over the nick and then a cutter is driven down through the metal cap, carrying with it the metal cut from the nick down to the bottom of the nick in the screw-head.

In the usual manner of cutting this nick, striking the metal down into the neck, "bulges" the cap out at each end of the nick. It is therefore necessary to place the screw in a die and strike a blow to return the metal of the cap to its proper position before the metal can be burnished.

To avoid this last difficulty and construct a tool for hand use is the object of our invention; and It consists—

First, in the construction of a cutter to be used for striking down the metal, with a downward projection at each end of the cutter, to close onto the outside of the cap beyond the end of the nick, and return the displaced metal by the same operation which cuts the nick, which said cutter is alike applicable to machine and hand-tools.

Also, combining with a cutter thus constructed a pair of fingers or guides which project below the cutter and hold it in proper relative position for the cutting of the nick.

$a$ is the cutter, seen detached in fig. 4, and is curved upon its edge, corresponding to the curve of the bottom of the nick in the screw-head.

At each end of the cutter a downward projection, $i\ i$, is formed, corresponding to the shape of the head below the nick, so that when the cutter is driven down into the nick, as seen in fig. 1, these projections $i$ close down tight onto the cap and return or prevent the bulging of the metal, as in the usual method of cutting the nicks.

The cutter thus formed is alike applicable to machine or hand tools.

For hand-work we arrange the cutter $a$ in a seat, $d$, of a handle, A, and form notches, $f$, with corresponding projections, $n$, on the cutter, to insure its proper adjustment in the handle.

At each end of the cutter we extend downward a guide, $b$, which serves to govern the proper position of the cutter, as seen in fig. 1, the width between the guides corresponding to the diameter of the head or diameter of the die, as the case may be.

The cutter is held in position by a cap, B, secured to the handle and overlapping the cutter, as seen in figs. 1 and 2.

While the cutter of a hand-tool is easier made separate from the handle, it will be observed by those skilled in the art that, if preferred, the cutter $a$ may be wrought in the handle to the shape described; but, practically, we prefer to make them separate.

We claim as our invention—

1. The herein-described cutter $a$, for cutting nicks in capped screws, constructed with projections $i\ i$, combined with a handle or stock, A, as and for the purpose specified.

2. In combination with the cutter $a$, constructed as described, the guides $b\ b$, combined with a handle or stock, A, as and for the purpose described.

WM. HILLHOUSE.
GEO. W. BRIGGS.

Witnesses:
JOSIE C. EARL,
JOHN E. EARL.